(12) United States Patent
Fukumoto

(10) Patent No.: US 7,778,047 B2
(45) Date of Patent: *Aug. 17, 2010

(54) INVERTER

(75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/407,272

(22) Filed: Mar. 19, 2009

(65) Prior Publication Data

US 2009/0184654 A1 Jul. 23, 2009

Related U.S. Application Data

(63) Continuation of application No. 11/786,159, filed on Apr. 11, 2007, now Pat. No. 7,525,820.

(30) Foreign Application Priority Data

Apr. 12, 2006 (JP) .............................. 2006-109702

(51) Int. Cl.
*H02M 3/335* (2006.01)
*H02M 3/24* (2006.01)
(52) U.S. Cl. ........................... 363/16; 363/98; 363/132; 315/308
(58) Field of Classification Search .................... 363/16, 363/17, 97, 98, 131, 132; 315/308; 345/211
See application file for complete search history.

(56) References Cited

U.S. PATENT DOCUMENTS

| 4,692,851 | A | | 9/1987 | Attwood |
| 5,062,031 | A | | 10/1991 | Flachenecker et al. |
| 5,786,990 | A | | 7/1998 | Marrero |
| 5,864,472 | A | | 1/1999 | Peterson |
| 7,525,820 | B2 | * | 4/2009 | Fukumoto ..................... 363/16 |

FOREIGN PATENT DOCUMENTS

JP         2003-153529 A       5/2003

* cited by examiner

*Primary Examiner*—Jessica Han
(74) *Attorney, Agent, or Firm*—Cantor Colburn LLP

(57) ABSTRACT

Primary and secondary regions are electrically insulated from each other. The first and second pulse transformers are provided to the respective transistors in the switching circuit. Secondary windings of the first and second pulse transformers are connected to control terminals of the transistors. The control circuit supplies switching voltages to primary windings of the pulse transformers based on a feedback signal fed back through a feedback line. A primary winding of a transformer, the switching circuit, and the secondary windings are disposed on the primary region. A secondary winding of the transformer, the primary windings, the feedback line, and the control circuit are disposed on the secondary region.

11 Claims, 4 Drawing Sheets

INVERTER

CROSS REFERENCE TO RELATED APPLICATIONS

The present application is a continuation application of U.S. patent application Ser. No. 11/786,159, filed on Apr. 11, 2007, the entire contents of which are incorporated herein by reference. The 11/786,159 application claimed the benefit of the date of the earlier filed Japanese Patent Application No. JP2006-109702 filed Apr. 12, 2006, the benefit of which is also claimed herein.

BACKGROUND OF THE INVENTION

1. Field of the Invention

The present invention relates to an inverter apparatus for supplying a driving voltage to a fluorescent lamp, and more particularly to, an inverter apparatus used for a power supply apparatus including a primary region and a secondary region which need to be electrically insulated from each other.

2. Description of the Related Art

Recently, as a substitute for CRT televisions, thin, wide screen liquid crystal televisions have been widely provided. As a backlight for the liquid crystal television, a plurality of cold cathode fluorescent lamps (hereinafter, referred to as CCFLs) or a plurality of external electrode fluorescent lamps (hereinafter, referred to as EEFLs) are disposed on a rear surface of a liquid crystal panel.

The liquid crystal television includes a power supply apparatus which performs AC/DC conversion of a commercial AC voltage to a DC voltage (hundreds of volts). The power supply apparatus is divided into a primary region and a secondary region which need to be electrically insulated from each other.

Now, an inverter (DC/AC converter) which cooperates with the power supply apparatus to convert the DC voltage of hundreds of volts to a boosted AC voltage and supply the AC voltage to the fluorescent lamp is considered. FIG. 1 is a block diagram illustrating a construction of a power supply system including the primary and secondary regions. The power supply system 500 includes an AC/DC converter 410 which converts the commercial AC voltage Vac to a DC voltage Vdc and an inverter apparatus 420 which converts the DC voltage Vdc output from the AC/DC converter 410 to an AC driving voltage Vdrv and supply the driving voltage Vdrv to the fluorescent lamp 430 which is a load.

For example, the AC/DC converter 410 may include a full-wave rectifier circuit 412 and a power factor control circuit 414. A DC voltage Vdc which is an output voltage from the AC/DC converter 410 is output to the inverter apparatus 420.

The inverter apparatus 420 includes a control circuit 422 and a transformer 424. The control circuit 422 monitors an electrical condition of a current flowing through the fluorescent lamp 430 which is to be driven or a voltage applied thereto and performs feedback control of a switching voltage applied to a primary winding of the transformer 424.

Referring to FIG. 1, the power supply system 500 is divided to the primary region 510 and the secondary region 520. In the power supply system 500, the AC/DC converter 410 is disposed on the primary region 510, and the fluorescent lamp 430 is disposed on the secondary region 520. As shown in FIG. 1, apart of the inverter apparatus 420 is disposed on the primary region 510, and the another part thereof is disposed on the secondary region 520. More specifically, the control circuit 422 and the primary winding of the transformer 424 is disposed on the primary region 510, and the secondary winding of the transformer 424 connected to the fluorescent lamp 430 is disposed on the secondary region 520. The control circuit 422 needs to monitor the electrical condition of the fluorescent lamp 430. As described above, the primary region 510 and the secondary region 520 need to be electrically insulated from each other.

In the power supply system 500, a photo coupler 440 is used to feed the electrical condition of the fluorescent lamp 430 disposed on the secondary region 520 back to the control circuit 422 disposed on the primary region 510. For example, a current of the fluorescent lamp 430 is converted to an electrical signal Sfb1 by a resistor element 432. The electrical signal Sfb1 is input to the photo coupler 440, so that the electrical signal can be converted to an optical signal by a light emitting diode. The converted optical signal is received by a photo diode or a photo transistor disposed on the primary region 510 to be converted to an electrical signal Sfb2, and electrical signal Sfb2 is fed back to the control circuit 422. The related art is disclosed in Japanese Patent Application Laid-Open No. 2003-153529 (Patent Document 1). In some cases, the feedback of the signal from the secondary region 520 back to the primary region 510 by using electromagnetic coupling of the transformer instead of the photo coupler.

[Patent Document 1] Japanese Patent Application Laid-Open No. 2003-153529

As described, in a case where the feedback of the signal from the secondary region 520 back to the primary region 510 is performed by using the photo coupler, since the electrical signal is converted to the optical signal, there is a problem in that accuracy of feedback deteriorates. In addition, if an efficiency of coupling between light emitting elements and light receiving elements varies over all the photo couplers, there is a problem in that luminance of a fluorescent tube varies.

In addition, since a plurality of the fluorescent lamps are used as the backlight of the liquid crystal television, the feedback of the signal from the secondary region 520 back to the primary region 510 needs to be performed through a plurality of paths. In this case, since the photo coupler needs to be provided to each path, there is a problem of high cost and increase in mounting area.

SUMMARY OF THE INVENTION

The present invention has been made in view of above problems. A general purpose of the present invention is to provide an inverter apparatus capable of stably driving a load without use of a photo coupler.

According to an embodiment of the present invention, there is provided an inverter apparatus which is incorporated in a power supply apparatus having primary and secondary regions which need to be electrically insulated from each other, converts a DC input voltage to an AC driving voltage and supplies the AC driving voltage to a load. The inverter apparatus includes: a transformer of which secondary winding is connected to the load; a switching circuit which includes a plurality of transistors connected to a primary winding of the transformer to alternately apply the input voltage and a fixed voltage lower than the input voltage to the primary winding of the transformer; a plurality of pulse transformers which are provided to the respective transistors of the switching circuit, secondary windings of the pulse transformers being connected to control terminals of a plurality of the transistors; a feedback line through which a feedback signal indicating an electrical condition of the load is fed back; and a control circuit which receives the feedback signal fed through the feedback line and supplies a switching voltage to the primary windings of a plurality of the pulse transformers based on the feedback signal. The primary winding of the transformer, the switching circuit, and the secondary windings of a plurality of the pulse transformers are disposed on the primary region, and the secondary winding of the transformer, the primary windings of a plurality of the pulse transformers, the feedback line, and the control circuit are disposed on the secondary region.

According to the embodiment, the control circuit is provided to the secondary region, so that the feedback signal from the load can be directly received via the feedback line. Therefore, the load can be stably driven.

A plurality of the transistors included in the switching circuit may be metal oxide semiconductor field effect transistors (MOSFETs), and the secondary windings of a plurality of the pulse transformers may be disposed on paths from the gates to sources of a plurality of the respective transistors.

The switching circuit may include high side and low side transistors which are connected in series between an input terminal applied with the input voltage and a ground terminal applied with the fixed voltage. In this case, the transformer may be connected to the high side and low side transistors in a form of a half bridge circuit.

The switching circuit may include first high side and low side transistors which are connected in series on a first path between an input terminal applied with the input voltage and a ground terminal applied with the fixed voltage and second high side and low side transistors which are connected in series on a second path between the input terminal and the ground terminal. In this case, the transformer may be connected to the switching circuit in a form of a full bridge circuit.

The electrical condition of the load may include the current flowing through the load, and the control circuit may supply a switching voltage to the primary windings of a plurality of the pulse transformers so that the current flowing through the load can approach a desired current value.

The load may be a fluorescent lamp. The fluorescent lamp may a cold cathode tube fluorescent lamp or an external electrode fluorescent lamp.

According to another embodiment of the present invention, there is provided a light emitting apparatus. The light emitting apparatus includes a fluorescent lamp and one of the aforementioned inverter apparatuses according to any of the aforementioned embodiments, which supplies an AC driving voltage to the fluorescent lamp that is the load.

According to the embodiment, since the electrical condition of the load fluorescent lamp, that is, the load can be directly monitored by using the feedback line, the fluorescent lamp can be accurately lighted, and the luminance can be suitably adjusted.

According to still another embodiment, there is a provided an image display apparatus such as a liquid crystal television and a liquid crystal monitor. The image display apparatus includes a liquid crystal panel and the aforementioned light emitting apparatus which is disposed as a backlight on a rear surface of the liquid crystal panel.

According to a further still another embodiment of the present invention, there is provided a power supply apparatus having primary and secondary regions which need to be electrically insulated from each other. The power supply apparatus includes: an AC/DC converter which is disposed on the primary region to convert an input commercial AC voltage to a DC voltage: and the aforementioned inverter apparatus which converts the DC voltage converted by the AC/DC converter to an AC voltage as an input voltage and supplies the AC voltage to a load disposed on the secondary region.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 2:
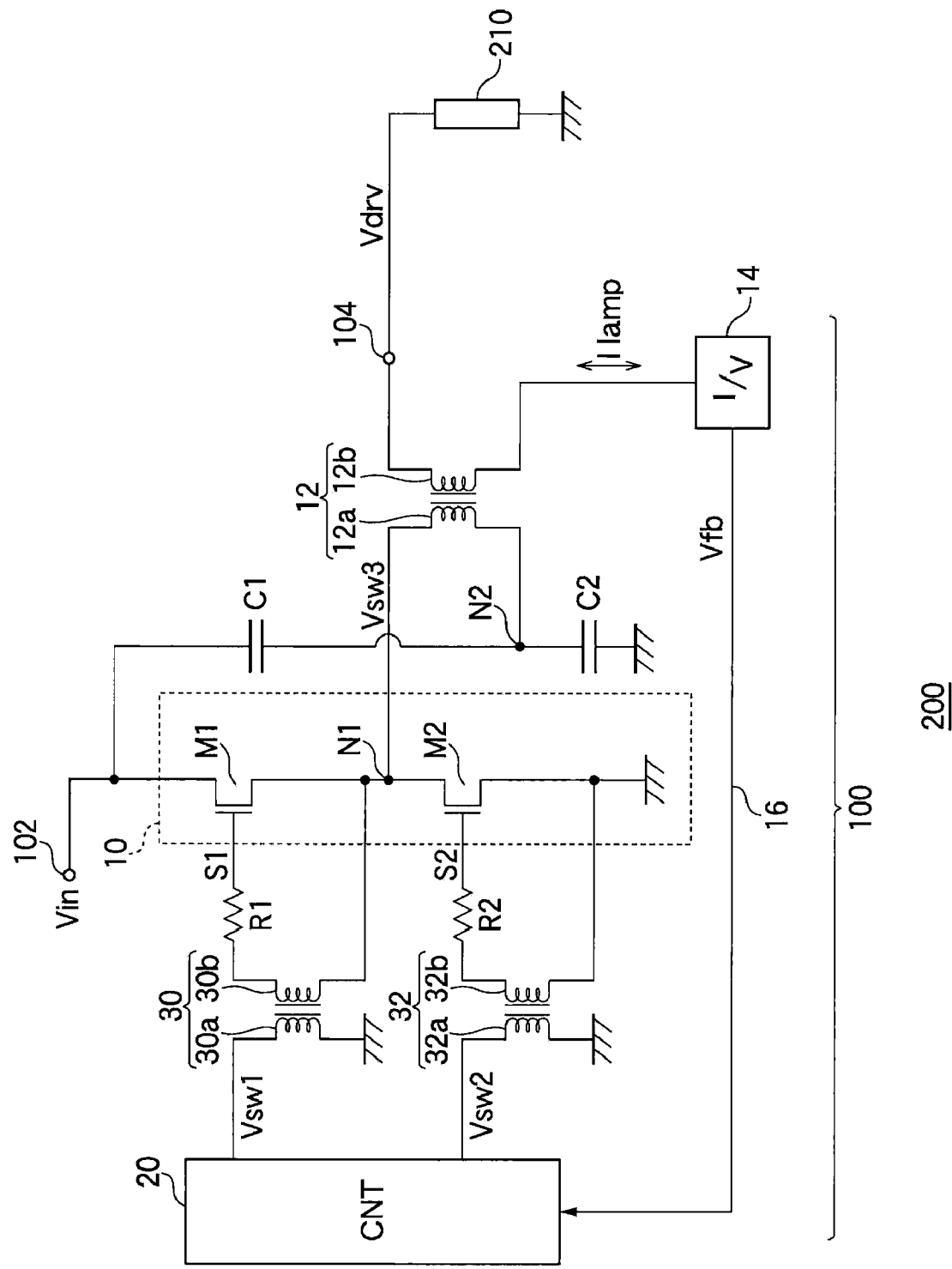
FIG. 2 is a circuit diagram illustrating a construction of a light emitting apparatus according to an embodiment of the present invention.
Figure 3:
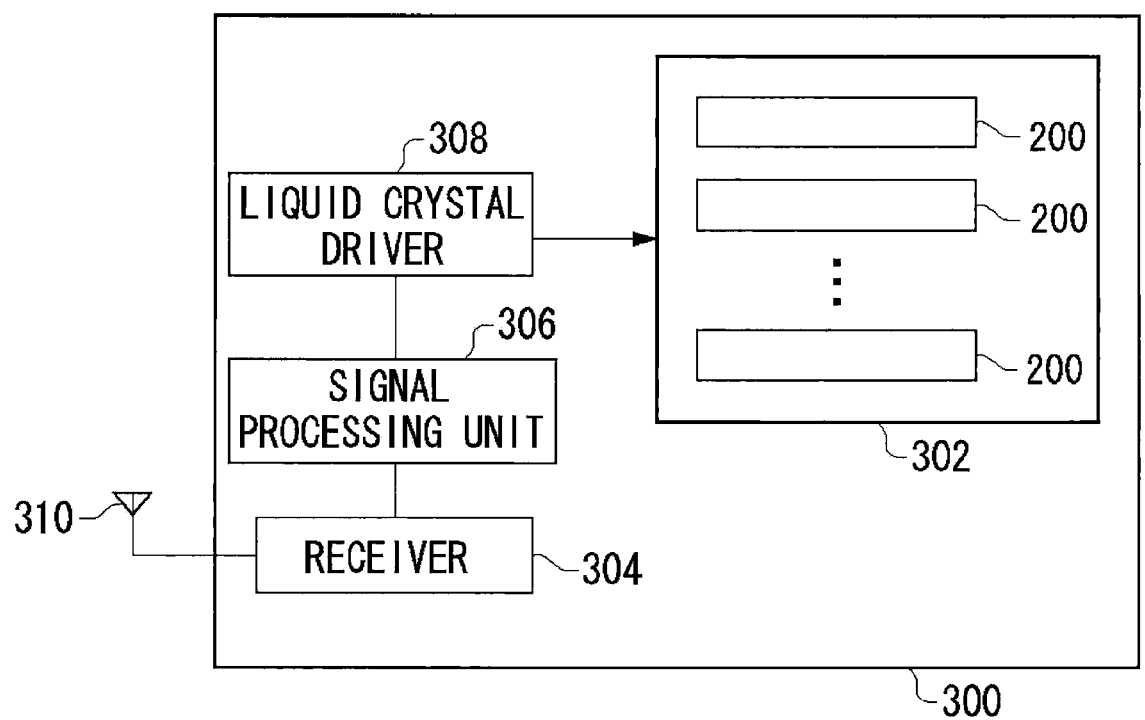
FIG. 3 is a block diagram illustrating a construction of a liquid crystal television which is provided with the light emitting apparatus of FIG. 2.

FIG. 2 is a circuit diagram illustrating a construction of a light emitting apparatus 200 according to an embodiment of the present invention. FIG. 3 is a block diagram illustrating a construction of a liquid crystal television 300 provided with the light emitting apparatus 200 of FIG. 2. Referring to FIG. 3, the liquid crystal television 300 is connected to an antenna 310. The antenna 310 receives a broadcast wave and outputs a received signal to a receiver 304. The receiver 304 detects and amplifies the received signal and outputs the resulting signal to a signal processing unit 306. The signal processing unit 306 outputs to a liquid crystal driver 308 an image data which can be obtained by demodulating a modulated data. The liquid crystal driver 308 outputs the image data for each scan line of a liquid crystal panel 302, so that an image can be displayed. As a backlight of the liquid crystal panel 302, a plurality of the light emitting apparatus 200 are disposed on a rear surface of the liquid crystal panel 302. The light emitting apparatus 200 according to the embodiment can be suitably used as the backlight of the liquid crystal panel 302. Now, a construction and operations of the light emitting apparatus 200 are described in detail with reference to FIG. 2.

The light emitting apparatus 200 according to the embodiment includes a fluorescent lamp 210 and an inverter 100. The fluorescent lamp 210 may be an EEFL or a CCFL. The fluorescent lamp 210 is disposed on the rear surface of the liquid crystal panel 302. The inverter 101 is incorporated in the power supply apparatus including the primary region and the secondary region which need to be electrically insulated from each other. The inverter 100 is a DC/AC converter which converts an input voltage Vin applied to an input terminal 102 to an AC driving voltage Vdrv and supplies the AC driving voltage Vdrv to the load, that is, the fluorescent lamp 210 connected to an output terminal 104. In the embodiment, the input voltage Vin is a high voltage in a range of 100V to 400V.

Although one fluorescent lamp 210 is shown in FIG. 2, a plurality of the fluorescent lamps 210 may be disposed in parallel. Now, a construction of the inverter according to the embodiment is described.

The inverter 100 includes a switching circuit 10, a transformer 12, a current-to-voltage converter 14, a feedback line 16, a control circuit 20, a first pulse transformer 30, a second pulse transformer 32, a first capacitor C1, a second capacitor C2, a first level-shift resistor R1, and a second level-shift resistor R2.

The transformer 12 includes a primary winding 12a and a secondary winding 12b. The load, that is, the fluorescent lamp 210 is connected directly or through other circuit components to the secondary winding 12b of the transformer 12.

The switching circuit 10 includes a high side transistor M1 and a low side transistor M2 which are connected in series between the input terminal 102 and the ground terminal which is applied with a ground voltage, that is, a fixed voltage. In the embodiment, the transformer 12 is connected to the high side transistor M1 and the low side transistor M2 in a half bridge manner.

Each of the high side transistor M1 and the low side transistor M2 is constructed with an N channel MOSFET. Namely, the source of the high side transistor M1 and the drain of the low side transistor M2 are connected to each other, and the drain of the high side transistor M1 and the source of the low side transistor M2 are connected to the input terminal 102 and the ground terminal, respectively. Alternatively, the high side transistor M1 and the low side transistor M2 may be constructed with P channel MOSFETs or bipolar transistors. In addition, the switching circuit 10 may be constructed as an H bridge circuit.

The gates of the high side transistor M1 and the low side transistor M2 are applied with a first control signal S1 and a second control signal S2, respectively. When the first control signal S1 is in the high level, the high side transistor M1 is turned on. When the second control signal S2 is in the high level, the low side transistor M2 is turned on. When the high side transistor M1 is turned on, a switching voltage Vsw3 emerging at a connecting point N1 is approximately equal to the input voltage Vin. When the low side transistor M2 is turned on, the switching voltage Vsw3 is approximately equal to the ground voltage.

The connecting point N1 of the high side transistor M1 and the low side transistor M2 is connected to one end of the primary winding 12a of the transformer 12. The other end N2 of the primary winding 12a is connected via the first capacitor C1 to the input terminal 102 and via the second capacitor C2 to the ground terminal. The switching circuit 10 applies to the primary winding 12a of the transformer 12 the switching voltage Vsw3 that is alternately repeating input voltage Vin and the ground voltage.

The current-to-voltage converter 14 is disposed on a current path of the fluorescent lamp 210 and the secondary winding 12b of the transformer 12. The current-to-voltage converter 14 converts a lamp current Ilamp of the fluorescent lamp 210 to a voltage by using a resistor element or the like. The current-to-voltage converter 14 performs half-wave rectification and flattening of the voltage to output a DC feedback signal Vfb.

The feedback line 16 is an interconnection though which the feedback signal Vfb indicating the lamp current Ilamp, that is, the electrical condition of the load, that is the fluorescent lamp is fed back to the control circuit 20. In addition to or instead of the feedback signal Vfb indicating the lamp current Ilamp, a feedback signal indicating the driving voltage Vdrv applied to the fluorescent lamp 210 may be fed back to the control circuit 20 through another interconnection.

The first and second pulse transformers 30 and 32 are provided to the transistors M1 and M2 of the switching circuit 10, respectively. One end of a secondary winding 30b of the first pulse transformer 30 is connected to the source of the high side transistor M1, and the other end thereof is connected through the first level-shift resistor R1 to the gate of the high side transistor M1. Similarly, one end of a secondary winding 32b of the second pulse transformer 32 is connected to the source of the low side transistor M2, and the other end thereof is connected through the second level-shift resistor R2 to the gate of the low side transistor M2. The secondary windings 30b and 32b of the first and second pulse transformers 30 and 32 are disposed on the corresponding paths from the gates to the sources of high side and low side transistors M1 and M2.

The control circuit 20 receives the feedback signal Vfb which is fed back via the feedback line 16. The control circuit 20 supplies first switching voltage Vsw1 and second switching voltage Vsw2 to the primary winding 30a of the first pulse transformer 30 and the primary winding 32a of the second pulse transformer 32, respectively, according to the feedback signal Vfb.

The control circuit 20 may be constructed by using an inverter control circuit including a general pulse width modulator. For example, the control circuit 20 may include an error amplifier, an oscillator, and a comparator. The error amplifier amplifies an error between the feedback signal Vfb fed back through the feedback line 16 and a reference voltage Vref set corresponding to luminance of the fluorescent lamp 210 and outputs an error signal Verr. The oscillator outputs a triangular or sawtooth waveform period signal Vosc having a predetermined frequency. The comparator compares the period signal Vosc with the error signal Verr and outputs a pulse width modulated signal (hereinafter, refereed to as a PWM signal Vpwm) of which level is changed between a high level and a low level according to the result of comparison. The control circuit 20 outputs the PWM signal Vpwm as the first switching voltage Vsw1 or the second switching voltage Vsw2 through a driver circuit. Logic values of the first and second switching voltages Vsw1 and Vsw2 are in the inverted relation.

Figure 4:
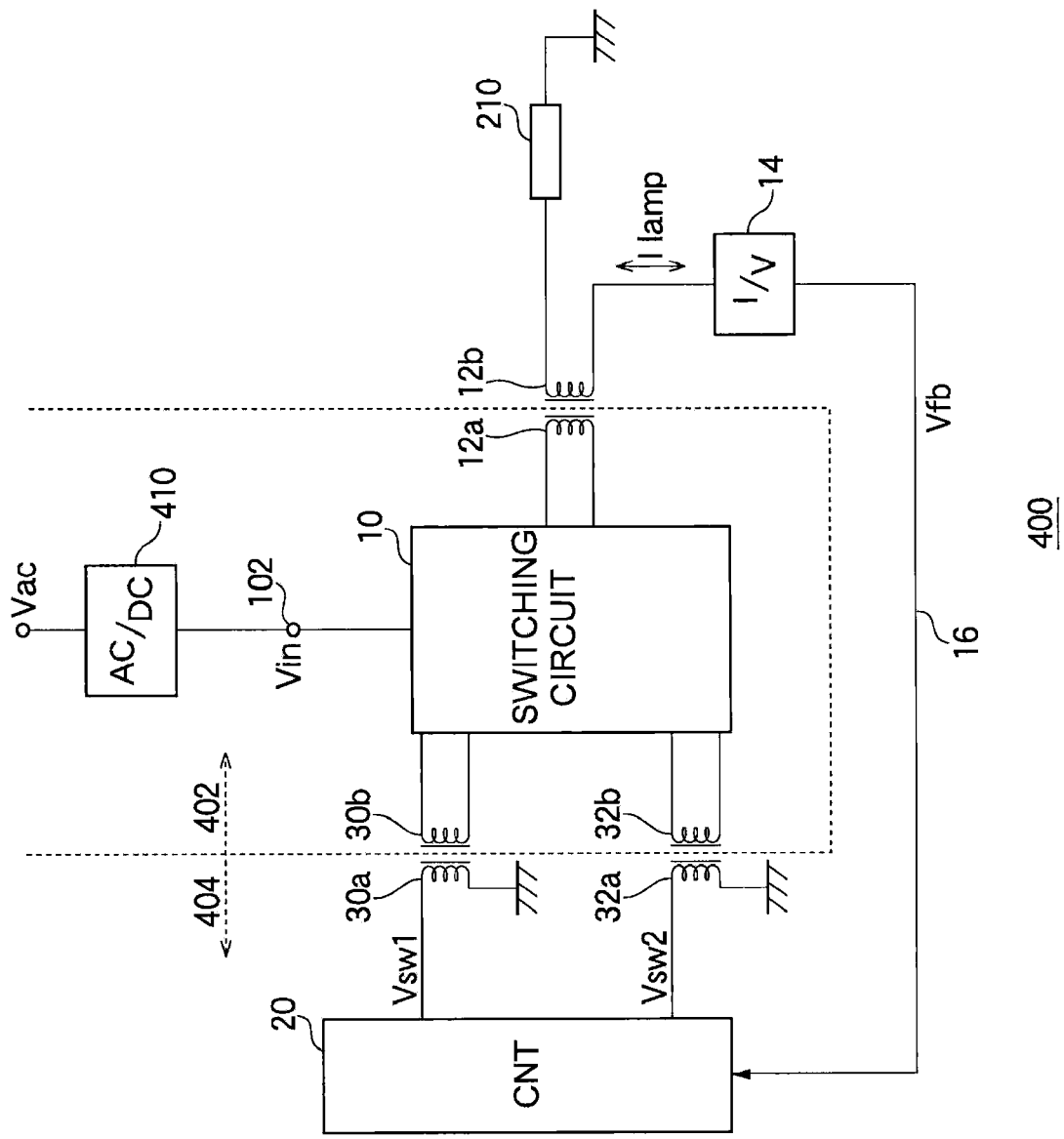
FIG. 4 is a circuit diagram illustrating an arrangement of an inverter of FIG. 2.

FIG. 4 is a circuit diagram illustrating an arrangement of the inverter 100 of FIG. 2. Referring to FIG. 4, the power supply system 400 is provided with the inverter 100. The power supply system 400 is divided into a primary region 402 and a secondary region 404. The primary region 402 and the secondary region 404 are electrically insulated from each other. An AC/DC converter 410 which converters a commercial AC voltage Vac to a DC voltage is disposed on the primary region 402. A load, that is, a fluorescent lamp 210 is disposed on the secondary region 404.

In the power supply system 400, each block of the inverter 100 according to the embodiment is disposed as follows. The primary winding 12a of the transformer 12, the switching circuit 10, the secondary winding 30b of the first pulse transformer 30, and the secondary winding 32b of the second pulse transformer 32 are disposed on the primary region 402. The secondary winding 12b of the transformer 12, the current-to-voltage converter 14, the feedback line 16, the control circuit 20, the primary winding 30a of the first pulse transformer 30, and the primary winding 30b of the second pulse transformer 32 are disposed on the secondary region 404.

Now, the operations of the inverter 100 as constructed above are described. The first and second switching voltages Vsw1 and Vsw2 alternately repeats inverted levels, that is, high and low levels according to the feedback signal Vfb from the current-to-voltage converter 14. The first switching voltage Vsw1 applied to the primary winding 30a of the first pulse transformer 30 is amplified according to the winding ratio of the first pulse transformer 30, and a level thereof is shifted by the first level-shift resistor R1, so that a voltage enough to turn on the high side transistor M1 is supplied between the gate and the source of the high side transistor M1. Similarly, the second switching voltage Vsw2 applied to the primary winding 32a of the second pulse transformer 32 is amplified according to the winding ratio of the second pulse transformer 32, and a level thereof is shifted by the second level-shift resistor R2, so that a voltage enough to turn on the low side transistor M2 is supplied between the gate and the source of the low side transistor M2. As a result, each of the high side transistor M1 and the low side transistor M2 alternately turns on and off according to a duty ratio of the PWM signal Vpwm generated by the control circuit 20.

When the high side transistor M1 and the low side transistor M2 alternately turn on and off, the input voltage Vin and the ground voltage are alternately applied to the primary winding 12a of the transformer 12, so that energy can be supplied to the transformer 12. As a result, the driving voltage Vdrv that is boosted up according to the winding ratio of the transformer 12 is generated in the secondary winding 12b of the transformer 12, so that the driving voltage Vdrv can be supplied to the fluorescent lamp 210.

The duty ratio of the PWM signal Vpwm can be adjusted by the control circuit 20 so that the feedback signal Vfb is equal to the reference voltage. As a result, the lamp current Ilamp of the fluorescent lamp 210 can be maintained in a predetermined value to obtain a desired luminance, so that the fluorescent lamp 210 can stably emit light.

According to the inverter 10 and the power supply system 400 of the embodiment, the following advantages can be obtained.

In the embodiment, the control circuit 20 of the inverter 100 is disposed on the secondary region 404. In addition, the first pulse transformer 30 and second pulse transformer 32 are disposed, so that the primary region 402 and the secondary region 404 can be electrically insulated from each other. In addition, due to control circuit 20 disposed on the secondary region 404, the switching circuit 10 disposed on the primary region 402 can be driven. As a result, the control circuit 20 can directly receive the feedback signal Vfb from the load through the feedback line 16, so that the number of parts such as a photo coupler can be reduced. In addition, the inverter 100 according to the embodiment can stably drive the load in comparison with a case where the feedback control is performed by using a photo coupler. Although one fluorescent lamp 210 is shown in FIG. 4, in a practical case, a plurality of fluorescent lamps 210 and a plurality of the control circuits 20 are mounted. Since the photo couplers are replaced with the feedback line 16, it is possible to obtain great advantages in terms of the mounting area and cost.

According to the embodiment, although a coupling coefficient between the primary and secondary windings is changed due to non-uniformity of the winding ratios of the first and second pulse transformers 30 and 32, the driving state of the fluorescent lamp 210 cannot be almost influenced. In other words, the information transmitted from the secondary region 404 to the primary region 402 through the first and second pulse transformers 30 and 32 is associated with the turning-on and turning-off states of the high side and low side transistors M1 and M2. Therefore, although the voltage levels of the first and second control signals S1 and S2 vary due to the change in the coupling coefficient, the energy supplied to the transformer 12 is not almost influenced. In addition, although the accuracy of turning-on of the high side and low side transistors M1 and M2 varies due to the change in the coupling coefficient, the lamp current Ilamp can be fed back so as to be maintained in a desired value by changing the duty ratios of the first and second switching voltages Vsw1 and Vsw2, so that the change in the accuracy of turning-on can be corrected. Therefore, the fluorescent lamp 210 can be also stably driven.

Figure 1:
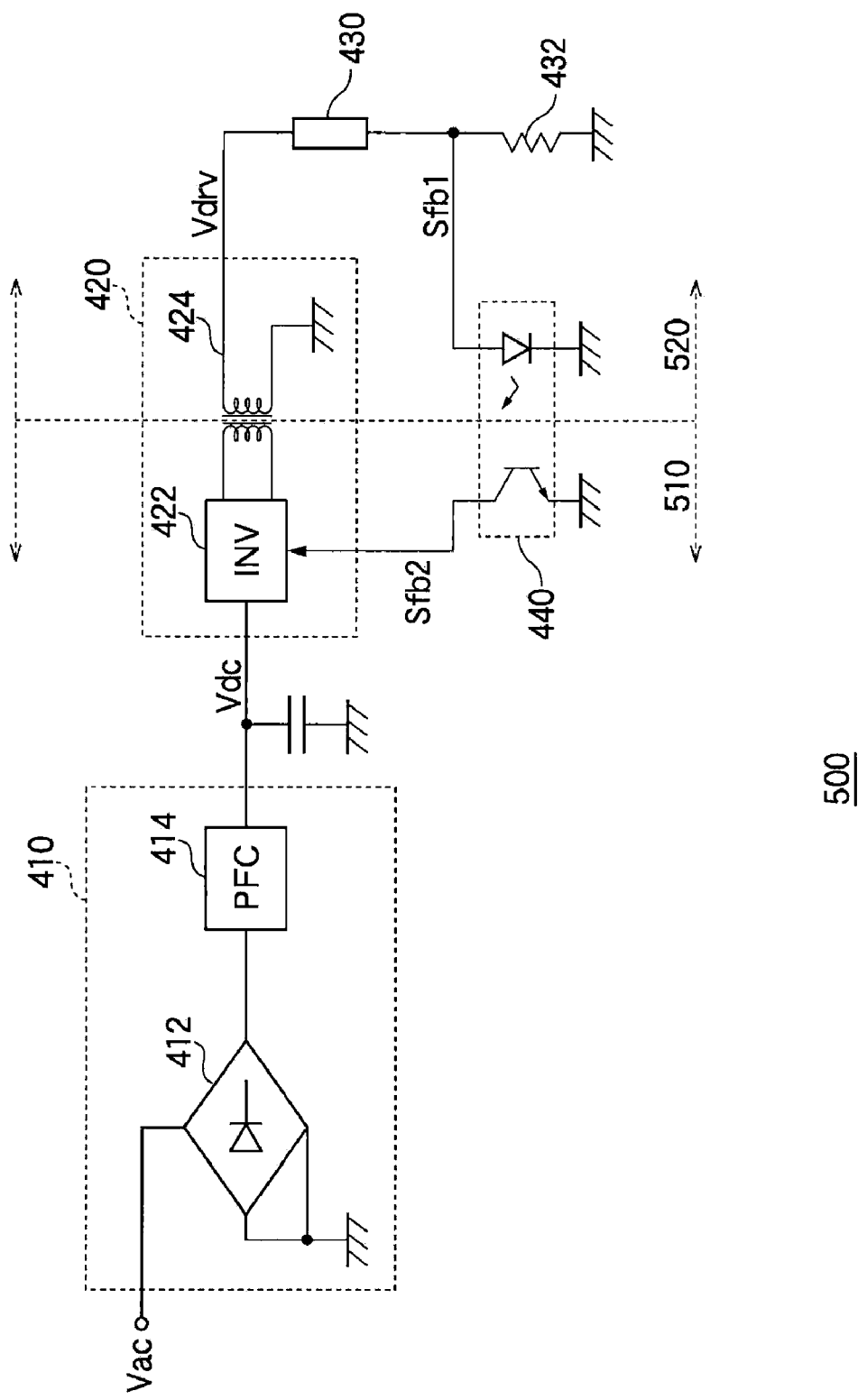
FIG. 1 is a block diagram illustrating a construction of a power supply system including a primary region and a secondary region.

According to the embodiment, the breakdown voltage of the driver circuit which supplies the first and second switching voltages Vsw1 and Vsw2 to the primary windings 30a and 32a of the first and second pulse transformers 30 and 32 can be maintained in a low level. Namely, in the power supply systems shown in FIGS. 1 and 4, if the input voltage is such a high voltage as 100V or more, a very high voltage needs to be applied as the gate voltage in order to turn on and off the transistors of the switching circuit 10. In the power supply system shown in FIG. 1, since the voltage is applied to the gates of the transistors of the switching circuit 10 directly without using a pulse transformer, the driver circuit needs to be constructed to have a high breakdown voltage. However, in the inverter 100 according to the embodiment, since the transistors of the switching circuit 10 are driven by using the pulse transformers 30 and 32, a voltage of several volts to tens of volts is sufficient for the primary windings 30a and 32a of the first and second pulse transformers 30 and 32. Therefore, the driver circuit need not have a high breakdown voltage. For the reason, in the embodiment, the driver circuit can be incorporated in the control circuit 20.

It can be understood by the skilled in the art that the embodiment is only exemplary and various modifications can be made by combination of aforementioned components and processes without departing from the scope of the present invention.

Although the transistors of the switching circuit 10 are constructed with N channel MOSFETs in the embodiment, P channel MOSFETs may be used. In addition, the present invention is not limited to the half bridge circuit, but a full bridge circuit or other circuits may be used. In case of the full bridge circuit, the switching circuit 10 may include first high side and low side transistors which are connected in series on the first path between the input terminal 102 and the ground terminal and second high side and low side transistors which are connected in series on the second path between the input terminal 102 and the ground terminal.

In the circuit diagram of FIG. 2, the one end of the fluorescent lamp 210 is connected to a fixed voltage, but the present invent is not limited thereto. Instead of the fixed voltage, a voltage having an inverted phase of the driving voltage Vdrv applied to the other end of the fluorescent lamp 210 may be applied to the one end of the fluorescent lamp 210.

For simplifying the description of the embodiment, one fluorescent lamp 210 is driven in the light emitting apparatus 200. However, in a practical case, a plurality of the fluorescent lamps 210 may be driven. In this case, a plurality of the fluorescent lamps 210 can be driven by using a known technology. In particularly, the present invention can be employed without limitation to a topological construction.

In addition, the load driven by the inverter 100 according to the embodiment is not limited to the fluorescent tube. Various devices requiring a high AC voltage may be used as the load.

In the embodiment, settings of logic values, that is, the high and low levels of the logic circuits are exemplary ones. Therefore, various settings of logic values can be made by suitable inversion using an inverter or the like.

While the preferred embodiments of the present invention have been described using specific terms, such description is for illustrative purposes only, and it is to be understood that changes and variations may be made without departing from the spirit or scope of the appended claims.

What is claimed is:

1. An inverter apparatus which is incorporated in a power supply apparatus having primary and secondary regions which need to be electrically insulated from each other, converts an input voltage to an AC driving voltage and supplies the AC driving voltage to a load, the inverter apparatus comprising:

a transformer of which secondary winding is connected to the load;

a switching circuit which includes a plurality of transistors connected to a primary winding of the transformer to alternately apply the input voltage and a fixed voltage lower than the input voltage to the primary winding of the transformer;

a pulse transformer of which secondary winding being connected to control terminals of a plurality of the transistors;

a feedback line through which a feedback signal indicating an electrical condition of the load is fed back; and a control circuit which receives the feedback signal fed through the feedback line and supplies a switching voltage to a primary winding of the pulse transformer based on the feedback signal, wherein the primary winding of the transformer, the switching circuit, and the secondary winding of the pulse transformer are disposed on the primary region, and the secondary winding of the transformer, the primary winding of the pulse transformer, the feedback line, and the control circuit are disposed on the secondary region.

2. The inverter apparatus according to claim 1, wherein a plurality of the transistors included in the switching circuit are metal oxide semiconductor field effect transistors (MOSFETs), and the secondary windings of a plurality of the pulse transformers are disposed on paths from the gates to sources of a plurality of the respective transistors.

3. The inverter apparatus according to claim 1, wherein the switching circuit includes high side and low side transistors which are connected in series between an input terminal applied with the input voltage and a ground terminal applied with the fixed voltage, and the transformer is connected to the high side and low side transistors in a form of a half bridge circuit.

4. The inverter apparatus according to claim 1, wherein the switching circuit includes first high side and low side transistors which are connected in series on a first path between an input terminal applied with the input voltage and a ground terminal applied with the fixed voltage, and second high side and low side transistors which are connected in series on a second path between the input terminal and the ground terminal, and the transformer is connected to the switching circuit in a form of a full bridge circuit.

5. The inverter apparatus according to claim 1, wherein the electrical condition of the load includes the current flowing through the load, and the control circuit supplies a switching voltage to the primary windings of a plurality of the pulse transformers so that the current flowing through the load can approach a desired current value.

6. The inverter apparatus according to claim 1, wherein the load is a fluorescent lamp.

7. A light emitting apparatus comprising:

a fluorescent lamp; and the inverter apparatus according to claim 1, which supplies an AC driving voltage to the fluorescent lamp that is the load.

8. The light emitting apparatus according to claim 7, wherein the fluorescent lamp is a cold cathode tube fluorescent lamp.

9. The light emitting apparatus according to claim 7, wherein the fluorescent lamp is an external electrode fluorescent lamp.

10. An image display apparatus comprising:

a liquid crystal panel; and the light emitting apparatus according to claim 7, which is disposed as a backlight on a rear surface of the liquid crystal panel.

11. A power supply apparatus having primary and secondary regions which need to be electrically insulated from each other, the power supply apparatus comprising:

an AC/DC converter which is disposed on the primary region to convert an input commercial AC voltage to a DC voltage; and the inverter apparatus according to claim 1, which converts the DC voltage converted by the AC/DC converter to an AC voltage as an input voltage and supplies the AC voltage to a load disposed on the secondary region.

* * * * *